US006799191B2

United States Patent
Agesen et al.

(10) Patent No.: US 6,799,191 B2
(45) Date of Patent: Sep. 28, 2004

(54) OBJECT SAMPLING TECHNIQUE FOR RUNTIME OBSERVATIONS OF REPRESENTATIVE INSTANCES THEREOF

(75) Inventors: Ole Agesen, Palo Alto, CA (US); Alexander T. Garthwaite, Beverly, MA (US); Timothy L. Harris, Cambridge (GB)

(73) Assignee: Sun Microsystems, Inc., Santa Clara, CA (US)

( * ) Notice: Subject to any disclaimer, the term of this patent is extended or adjusted under 35 U.S.C. 154(b) by 441 days.

(21) Appl. No.: 09/855,454

(22) Filed: May 15, 2001

(65) Prior Publication Data

US 2002/0019716 A1 Feb. 14, 2002

Related U.S. Application Data

(60) Provisional application No. 60/204,455, filed on May 16, 2000.

(51) Int. Cl.$^7$ .............................................. G06F 12/00
(52) U.S. Cl. ...................................... 707/206; 719/316
(58) Field of Search .................. 707/206; 711/170–173, 711/200–209; 719/315–318

(56) References Cited

U.S. PATENT DOCUMENTS

| | | | |
|---|---|---|---|
| 5,398,334 A | | 3/1995 | Topka et al. |
| 5,857,210 A | * | 1/1999 | Tremblay et al. ........... 707/206 |
| 5,873,105 A | * | 2/1999 | Tremblay et al. ........... 707/206 |
| 6,047,125 A | * | 4/2000 | Agesen et al. .............. 717/148 |
| 6,065,020 A | | 5/2000 | Dussud |
| 6,442,661 B1 | * | 8/2002 | Dreszer ....................... 711/170 |

FOREIGN PATENT DOCUMENTS

WO      WO 00/00885      *   1/2000    ............. G06F/9/00

OTHER PUBLICATIONS

Andrew W. Appel, "Simple Generational Garbage Collection and Fast Allocation," *Software Practice and Experience*, 19(2), Feb. 1989, pp. 171–183.

David A. Barrett and Benjamin G. Zorn, "Garbage Collection using a Dynamic Threatening Boundary," LaJolla, CA, ACM SIGPLAN Notices, vol. 30, pp. 301–311, Jun. 1995, ACM Press, Proc. SIGPLAN 95 Conf. on CCD.

David A. Barrett and Benjamin G. Zorn, "Using Lifetime Predictors to Improve Memory Allocation Performance," Albuquerque, NM, ACM SIGPLAN Notices, 28(6), pp. 187–196, Jun. 1993, ACM Press. Proc. SIGPLAN 93 Conf. on CCD.

(List continued on next page.)

*Primary Examiner*—St. John Courtenay, III
(74) *Attorney, Agent, or Firm*—Zagorin, O'Brien & Graham LLP (57) ABSTRACT

With better knowledge of the behavior of objects in a running application, it is possible to improve execution environment decisions that affect management of such objects. For example, if available, object lifetime statistics could be employed in decisions that affect how and where objects are placed, e.g., on allocation or during operation of automatic dynamic memory management facilities such as a garbage collector. Typically, instrumenting all objects to sample lifetimes or other characteristics would impose an impractical level of overhead. We present a technique for dynamic sampling of a subset of allocated objects that incurs low runtime overheads. Coupled with automatic memory management or collection facilities, this technique allows us to improve the efficiency of a collector by segregating objects, sampled and non-sampled alike, based on observed characteristics such as object lifetime. The sampling techniques facilitate tracking of many kinds of object information. For purposes of illustration, an exemplary implementation is described in which such sampling techniques are exploited to improve performance of generational garbage collectors.

46 Claims, 4 Drawing Sheets

OTHER PUBLICATIONS

Perry Cheng et al, "Generational Stack Collection and Profile–Driven Pretenuring," Montreal, Can. ACM SIGPLAN Notices, 33(5), pp. 162–173, Jun. 1998, ACM Press. Proc SIGPLAN 98 Conf. on CCD.

David R. Hanson, "Fast Allocation and Deallocation of Memory Based on Object Lifetimes," *Software—Practice and Experience*, vol. 20(1), pp. 5–12, Jan. 1990, John Wiley & Sons, Ltd.

Henry Lieberman and Carl Hewitt, "A Real–Time Garbage Collector Based on the Lifetimes of Objects," Communications of the ACM, *Research Contributions, Programming Techniques and Data Structures*, H. Douglas McIlroy, Ed., 26(6), pp. 419–429, Jun. 1983.

Matthew L. Seidl and Benjamin G. Zorn, "Segregating Heap Objects by Reference Behavior and Lifetime," San Jose, CA, 8th Intl. Conf. on Architectural Support for CCD, ACM SIGPLAN Notices, 33(11), p. 12–23, Nov. 1998.

David Ungar and Frank Jackson, "An Adaptive Tenuring Policy for Generation Scavengers," *ACM Transactions on Programming Languages and Systems*, 14(1), pp. 1–27, Jan. 1992, ACM Press.

David Ungar and Frank Jackson, "Tenuring Policies for Generation–Based Storage Reclamation," Sep. 25–30, 1988, ACM SIGPLAN Notices, 23(11), pp. 1–17, OOPSLA '88 Proceedings.

David Ungar, "Generation Scavenging: A Non–disruptive High Performance Storage Reclamation Algorithm," ACM SIGPLAN Notices, 19(5), pp. 157–167, Apr. 1984.

Paul R. Wilson, "Uniprocessor Garbage Collection Techniques," 1992 Int'l. Workshop on Memory Management Proc., Springer–Verlag, pp. 1–42.

Benjamin G. Zorn, "Comparative Performance Evaluation of Garbage Collection Algorithms," PhD Thesis, 332 pp., Dec. 1989, available as TR UCB/CSD 89/544.

Richard Jones and Rafael Lins, "Garbage Collection–Algorithms for Automatic Dynamic Memory Management," John Wiley & Sons Ltd., 1996, pp. 1–41 and 143–181.

Richard L. Hudson and J. Elliott B. Moss, "Incremental Collection of Mature Objects," *Proceedings of International Workshop on Memory Management, vol. 637 of Lecture Notes in Computer Science*, St. Malo, France, Sep. 16–18, 1992, pp. 388–403.

Derek White and Alex Garthwaite, "The GC Interface in the EVM," *Technical Report SML TR–98–67*, Dec. 1998, pp. 1–45.

"Memory Allocation Monitoring Class", IBM Technical Disclosure Bulletin, IBM Corp., New York, p. 445, vol. 37, No. 04A, Apr. 1994 (1 page).

R. Kent Dybvig et al, "Guardians in a Generation–Based Garbage Collector," ACM SIGPLAN Notices, Association for Computing Machinery, vol. 28, No. 6, Jun. 1993, New york, pp. 207–216.

* cited by examiner

OBJECT SAMPLING TECHNIQUE FOR RUNTIME OBSERVATIONS OF REPRESENTATIVE INSTANCES THEREOF

CROSS-REFERENCE TO RELATED APPLICATION(S)

This application claims benefit of U.S. Provisional Application No. 60/204,455, filed May 16, 2000.

In addition, this application is related to U.S. patent application Ser. No. 09/855,453, entitled "DYNAMIC ADAPTIVE TENURING OF OBJECTS," naming Agesen, Garthwaite and Harris as inventors and filed on even date herewith, the entirety of which is hereby incorporated by reference.

BACKGROUND OF THE INVENTION

1. Field of the Invention

The present invention relates to execution behavior of computer programs and, more particularly, to techniques for sampling software objects during respective lifetimes thereof.

2. Description of the Related Art

In general, runtime characteristics and/or populations of software objects can affect performance and operation of a variety of computational systems. For example, the efficacy of certain automatic dynamic memory management systems (e.g., garbage collectors) can be significantly affected by lifetimes of software objects. In some cases, such runtime characteristics may be empirically predicted and computational strategies may be tailored in accordance with such predictions. In other cases, simulations or profile-driven (i.e., off-line) techniques may be employed to better tailor computational strategies.

Generational collection is an automatic dynamic memory management technique that aims to improve the performance of a garbage collected heap. Objects within the heap are divided into two or more generations according to the elapsed time since their allocation. As is customary, references to time, ages, older or younger should be taken to be in terms of an allocation clock (measuring the total volume of objects allocated since the program started) rather than a wall clock (measuring elapsed real time). In the simplest case, there are only two generations, which can be termed young and old. The young generation is subject to more frequent garbage collection than the old generation. Objects are allocated into the young generation and subsequently tenured into the old generation if they survive longer than some threshold.

This scheme is generally effective because many objects are short-lived and so it is worthwhile concentrating on the young objects (which are likely to die) rather than on the older objects (which are likely to continue to survive). The fact that many objects die young makes it desirable to use a copying collector for the young generation. In such implementations, only the few objects that survive need to be copied. In a typical implementation, each generation is held in a separate part of the heap. This approach allows the generations to be managed by different garbage collectors and according to different allocation policies. The physical separation means that an object is copied when it is tenured. Consequently, long-lived objects are often copied several times before they come to rest in the old generation. Pre-tenured allocation, i.e., allocating an object into an old (or older) generation, can avoid some of this copying.

Previous work has investigated feedback-based techniques for segregating long-lived and short-lived objects. Barrett and Zorn attempted to predict short-lived objects in a number of allocation-intensive applications written in C. See generally, David A. Barrett and Benjamin G. Zorn, "Using Lifetime Predictors to Improve Memory Allocation Performance," ACM SIGPLAN Notices, 28(6):187–193, June 1993. They used profile-driven full-run feedback based on observed object lifetimes. Their goal was to reduce the fragmentation caused by long-lived objects scattered throughout the heap. They were also able to reduce the cost of allocating short-lived objects by placing them contiguously and delaying deallocation until entire 4K batches became free.

In particular, Barrett and Zorn attempted to correlate short object lifetimes with the most recent n return addresses on the execution stack. They found that, typically, there was an abrupt step in the effectiveness of prediction when n reached some critical value. These critical values varied between applications, but were usually not greater than 4.

The effect of using these predictions was evaluated using a simulator which replayed allocation traces. Each entry in the allocation traces contained an identifier representing the object size and the complete call-chain to the allocation site. They estimated that the cost of computing a reasonable approximation to such an identifier was between 9 and 94 RISC-style instructions for each memory allocation made. While such costs may be acceptable for a free-list based allocator from the libc library, for other implementations, such overhead is unsatisfactory. For example, the fast-path of some allocators may utilize as few as 9 SPARC instructions. Accordingly, even the best-case estimate of overhead is substantial.

Seidl and Zorn proposed dividing the heap into a number of sections based on reference behavior and object lifetime. See generally, Matthew L. Seidl and Benjamin G. Zorn, "Segregating Heap Objects by Reference Behavior and Lifetime," ACM SIGPLAN Notices, 33(11):12–23, Nov. 1998. They identified four kinds of object: highly referenced objects that are accessed frequently, non-highly referenced objects that are accessed infrequently, short-lived objects that are deallocated soon after they are created and other objects which form the remainder of the heap. These divisions were designed to improve the program's usage of virtual memory pages. Seidl and Zorn's work used trace-driven full-run feedback to gather statistics about a number of large C applications, including AWK, PostScript and Pen interpreters. They identified two effective techniques for predicting, at allocation time, into which category an object should be placed.

The first, a path point predictor assumed that there is a high correlation between certain call sites in a program and the behavior of objects allocated in procedures 'below' these sites in the dynamic call graph. The intuition was that there are certain significant points at which the program changes between generating different kinds of object.

The second, a stack contents predictor, used a subset of the call chain at the time of allocation as a predictor of object behavior. For example, it considered the most recent n return addresses, for small values of n such as 3. In previous work, the authors showed that this was effective for programs written in C++ because a few stack frames were sufficient to disambiguate allocations occurring in common functions (such as object constructors, or malloc wrappers) that are invoked throughout the application.

Cheng, Harper and Lee described profile-based pretenuring in the context of the TIL compiler for Standard ML. See generally, Perry Cheng, Robert Harper, and Peter Lee, "Generational Stack Collection and Profile-Driven Pretenuring," *ACM SIGPLAN Notices*, 33(5):162–173, May 1998. They implemented profile-driven full-run feedback, employing the program counter of each allocation site as a predictor for whether an object would be long-lived.

Unfortunately, due to an absence of practical run-time sampling techniques, on-line, dynamic computation of object lifetimes has not been used. Instead, research has focused on profile-driven information gathered from previous runs of programs. Furthermore, previous approaches have had to use whole-program runs and have not been adaptive to changes in the execution of the application over time. In particular, they have not been able to capture phase-like changes in behavior of a program.

SUMMARY OF THE INVENTION

Accordingly, techniques have been developed whereby software objects can be sampled at run-time to obtain statistical information about allocation sites, object lifetimes, and other properties. Such run-time sampled information may be used to improve performance of memory systems by improving object tenuring and/or object placement decisions. While applications to pretenuring decisions in a garbage collected memory environment are particularly attractive, exploitations of techniques in accordance with the present invention are not limited thereto. Indeed, the object sampling techniques and facilities described herein may be employed in any of a variety of computational systems for which low-overhead runtime sampling of objects is desired. In some realizations, weak references are employed. In some realizations, representative subsets of objects are sampled.

In some realizations of the present invention, an allocator creates instances of data objects in response to requests from an application program or mutator. A subset at these objects are tracked by an object sampler. For an object selected to be tracked, a weak reference to the object is established to facilitate collection of information associated with the data object. Such information may identify the allocation time of the object, the application program requesting the object, the allocation call site, the type of the data object structure, etc. Once the data object is no longer reachable by a mutator, object termination begins. Typically, a garbage collector determines reachability using any of a variety of suitable techniques; however, explicit reclamation techniques may be employed in some realizations to trigger object termination. During this termination process, the object sampler collects additional information about the data object such as its termination time, and the weak reference established by the object sampler is removed. The object sampler then compiles and updates data object lifetime statistics based in part on the newly collected information. In some realizations, object statistics may be updated apart from termination. For example, in a generational collector implementation, statistics suitable for shaping a tenuring policy may be updated based on populations of sampled objects promoted from a younger generation to an older generation.

In one embodiment in accordance with the present invention, a method of generating object lifetime statistics based on run-time observations includes selecting from amongst object instances of an observed category, a sampled subset of the object instances allocated in one or more execution threads of a computational system; establishing (coincident with allocation of a sampled instance of an object) a weak reference thereto and associating therewith information indicative of at least allocation time; and referencing the sampled instances at run-time via the weak references and updating the object lifetime statistics based on the associated allocation time and then-current state. In some variations, the computational system includes a garbage collector and object lifetime statistics updating is performed in response to a determination by the garbage collector that one or more sampled instances have become unreachable. In some variations, the observed category corresponds to an object class. In some variations, the associated information indicates an allocation site or an allocating one of the execution threads.

In another embodiment in accordance with the present invention and suitable for an automatically reclaimed storage environment, a method of sampling instances of software objects during their respective lifetimes includes establishing weak references to respective of the sampled instances, each of the weak references identifying at least one respective sampled instance; associating allocation-time information with each sampled instance; and accessing the sampled instances via the weak references and performing an action based at least in part on a state of one or more of the sampled instances and respective allocation-time information. In various realizations, the sampled instances include a representative subset of a category of software objects that is object class specific, that is call-site specific, that corresponds to an activation record stack profile, that covers an abstract class or interface or that is specific to a particular garbage collection space. In some realizations, the method further includes selecting (at allocation time) the sampled instances from amongst all instances of a particular type. Selection may be performed in a variety of ways including based on allocation buffer overflow or based on a subset of allocations for each type of sampled software object.

In still another embodiment of the present invention, an object sampling facility includes a weak reference construct implemented by a computational system and an object fingerprinter. The object fingerprinter is responsive to a storage allocator of the computational system and object fingerprinter associates (1) allocation-time information and (2) an instance of the weak reference construct with at least a sampled subset of objects allocated by the storage allocator. In some variations, the object sampling facility includes an object sampler responsive to garbage collection events in the computational system. The object sampler references the sampled subset via the weak reference instances and maintains object lifetime statistics based on the associated allocation-time information and then-current state of the sampled subset. In some variations, the object sampling facility includes an object sampler that references the sampled subset via the weak reference instances and maintains object lifetime statistics based on the associated allocation-time information and sampled state of the sampled subset. The storage allocator can then be responsive to the object lifetime statistics in its allocation decisions.

In still yet another embodiment of the present invention, a computer program product includes at least one functional sequence for associating allocation-time information and an instance of a weak reference at least a sampled subset of objects allocated by a storage allocator and at least one functional sequence for sampling the sampled subset using the weak reference instances and maintaining object lifetime statistics based on the associated allocation-time information and sampled state of the sampled subset. In some variations, the computer program product further includes at least one functional sequence for tenuring certain object instances in accordance with those of the object lifetime statistics corresponding thereto.

In still yet another embodiment of the present invention, an apparatus includes (1) means for associating allocation-time information with sampled instances of software objects, (2) means for referencing the sampled instances of software objects, wherein the referencing means is operable for both reachable and unreachable software objects and (3) means for updating lifetime predictions for categories of the software objects based on run-time access to states of corresponding sampled instances and associated allocation-time information therefor.

These and other realizations will be appreciated based on the description and claims that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The description that follows presents a set of techniques, objects, functional sequences and data structures associated with an object sampling technique employing weak references. In particular, implementations are described in which object lifetime statistics are sampled and employed to improve object allocation and collection in a dynamic memory management system that builds on generational garbage collection techniques. Applications to dynamic adaptive pre-tenuring are described in some detail and provide a useful descriptive context. However, more generally, the techniques, objects, functional sequences and data structures described herein may be employed in a variety of other contexts to provide efficient sampling of objects during or toward the end of respective lifetimes thereof. For example, in addition to pre-tenuring or promoting an object into an older generation of objects, the described techniques may be employed to improve placement or movement of objects (e.g., at allocation or during program evaluation) within portions of a memory space or generation. The described techniques may also be employed to provide runtime feedback to a programmer for use in debugging or optimization. Techniques in accordance with the present invention may be employed to suggest which objects should be allocated in thread-local storage versus global areas of a memory space.

Some implementations of object sampling techniques in accordance with the present invention employ facilities and constructs typical of a language and/or execution environment such as that provided by the JAVA™ programming language and virtual machine implementations. Java and all Java-based marks and logos are trademarks or registered trademarks of Sun Microsystems, Inc. in the United States and other countries. Because facilities and constructs related to the Java programming language and virtual machine implementations are widely understood and documented, they provide a useful descriptive context. Nonetheless, nothing herein should be taken the scope of the present invention thereto. Indeed, the facilities and constructs employed in exemplary implementations may more generally be found or included in other language and execution environments, now or hereafter developed.

In view of the above, and without limitation, the description that follows focuses on sampling to obtain object lifetime statistics and their use in improving performance of generationally collected memory using certain programming constructs typical of language and execution environments such as that provided by implementations of the Java programming language and virtual machine. Based on the description herein, persons of ordinary skill in the art will appreciate these and other applications of the described techniques, which may fall within the scope of the appended claims.

Improving Generational Collectors

Traditionally, most programming languages have placed responsibility for dynamic allocation and deallocation of memory on the programmer. For example, in the C programming language, memory is allocated from the heap by the malloc procedure (or its variants). Given a pointer variable, p, execution of machine instructions corresponding to the statement p=malloc (size of (SomeStruct)) causes pointer variable p to point to newly allocated storage for a memory object of size necessary for representing a SomeStruct data structure. After use, the memory object identified by pointer variable p can be deallocated, or freed, by calling free (p). Pascal and C++ languages provide analogous facilities for explicit allocation and deallocation of memory.

Unfortunately, dynamically allocated storage becomes unreachable when no chain of references (or pointers) can be traced from a "root set" of references (or pointers) to the storage. Memory objects that are no longer reachable, but have not been freed, are called garbage. Similarly, storage associated with a memory object can be deallocated while still referenced. In this case, a dangling reference has been created. In general, dynamic memory can be hard to manage correctly. In most programming languages, heap allocation is required for data structures that survive the procedure that created them. If these data structures are passed to further procedures or functions, it may be difficult or impossible for the programmer or compiler to determine the point at which it is safe to deallocate them.

Because of this difficulty, garbage collection, i.e., automatic reclamation of dynamically-allocated storage after its last use by a program, can be an attractive alternative model of dynamic memory management. Garbage collection is particularly attractive for languages such as the Java programming language, Prolog, Lisp, Smalltalk, Scheme, Eiffel, Dylan, M L, Haskell, Miranda, etc. See generally, Jones & Lins, *Garbage Collection: Algorithms for Automatic Dynamic Memory Management*, pp. 1–41, Wiley (1996) for a discussion of garbage collection and of various classical algorithms for performing garbage collection.

Garbage collection services typically allocate objects from a heap. Periodically, many collector implementations locate the set of objects in the heap still reachable from the running program (or mutator) and free the rest of the memory in the heap so that it may be used for new allocation requests. Often, the collection technique involves stopping the application while this process of finding the reachable objects is performed. For large heaps, this may lead to long pauses during which the application is unable to proceed.

Generational collectors are designed to address part of this pause time problem. The observation is that recently allocated objects tend to die (that is, become unreachable) quickly. The approach in generational collectors is to divide the heap into an ordered sequence of two or more subheaps or generations. Objects are allocated primarily into the first generation. As objects survive collections in a particular generation, that generation will have a policy for promoting these longer-lived objects to the next generation. Most collection work is performed in the youngest generation, which is sized so that most collection-time pauses are of acceptably short duration. Because of high mortality rates for newly allocated objects, copying collection techniques are often employed in the young (or younger) generations.

One inefficiency of a generational heap is that long-lived objects may be copied many times before reaching the appropriate generation. Pretenuring of likely long-lived objects is one approach to reducing this inefficiency. Accordingly, the techniques described herein can improve performance generational collectors by identifying objects that will most likely survive to be tenured to a particular generation and by allocating such objects directly in that generation. By sampling a subset of the objects and studying their lifetimes, we are able to better place objects to reduce the number of times such objects are copied within a generation or promoted between generations. A side-benefit is that by not allocating long-lived objects in younger generations, we reduce the number of collections in those generations. Finally, our techniques can be employed to track how the observed lifetimes of objects change as the application executes. This allows the technique to adapt as the application changes the way in which it uses objects.

General Approach

Our sampling techniques build on programming constructs such as weak references. Simply put, a weak reference is a reference to an object with the property that is not considered by an automatic dynamic memory management facility (e.g., a garbage collector) when determining the reachability of the referred-to object. As long as some other stronger reference keeps the object alive, the weak reference will continue to refer to the object. However, at some point, the collector determines that the object is only reachable from weak references of a given strength. Then, an "imminent death" action can be performed, followed by clearance of the weak reference so that the referred object can subsequently be reclaimed. As used herein, the term "weak reference" may be understood to include any suitable application, language, or execution environment facility in accordance with the above description.

Conveniently, weak references are often available as first-class constructs in object-oriented language implementations, such as that provided by the Java platform. See generally, Java™ 2 Platform, Standard Edition, v 1.3, API Specification (available from Sun Microsystems, Inc., e.g., at http://java.sun.com). Alternatively, weak references can be an implementation-level construct visible only to the runtime system. Either form of weak reference may be used with our approach so long as the chosen form cannot cause an object to become reachable again.

Using Java platform weak reference constructs as a illustrative example, four kinds or strengths of weak references are implemented under the package java.lang.ref:

1. soft references meant to be used for implementing caches;
2. weak references meant to implement canonicalization data structures;
3. final references used to implement finalization; and
4. phantom references designed to schedule actions once an object ceases to be reachable.

In general, weak references to objects are processed in order of strength. Weak references, when processed, may be enqueued on a reference queue for further processing by the application. For our purposes, it is important to note that finalization of objects may result in those objects becoming strongly reachable again. Of the Java platform weak reference constructs, phantom references are guaranteed not to resuscitate a dying object. This means that phantom references or VM-specific weak references are appropriate choices for implementing our proposal in a Java virtual machine.

As a motivating example, suppose we want to determine the average lifespan of certain objects. Specifically, we might want to know if instances of a certain class X tend to live longer than instances of a certain other class Y. Monitoring all allocations of classes X and Y to compute the exact lifespan statistics may be too costly to be practical in the production use of most programs. However, it is possible that knowing the lifespans of a small fraction of all X and Y instances, say one in every 1000 allocated, allows us to estimate lifespans for the entire population of X and Y instances with a useful degree of accuracy. We can sample X and Y instances effectively by attaching a weak reference to every 1000th X and Y instance allocated. The weak reference tracks the instances, and the associated "imminent death" action will inform us when they cease to be alive. Thus, we get access to both the birth and death events for a specifiable fraction of X and Y instances, from which we can estimate their relative lifespans.

Figure 1A:
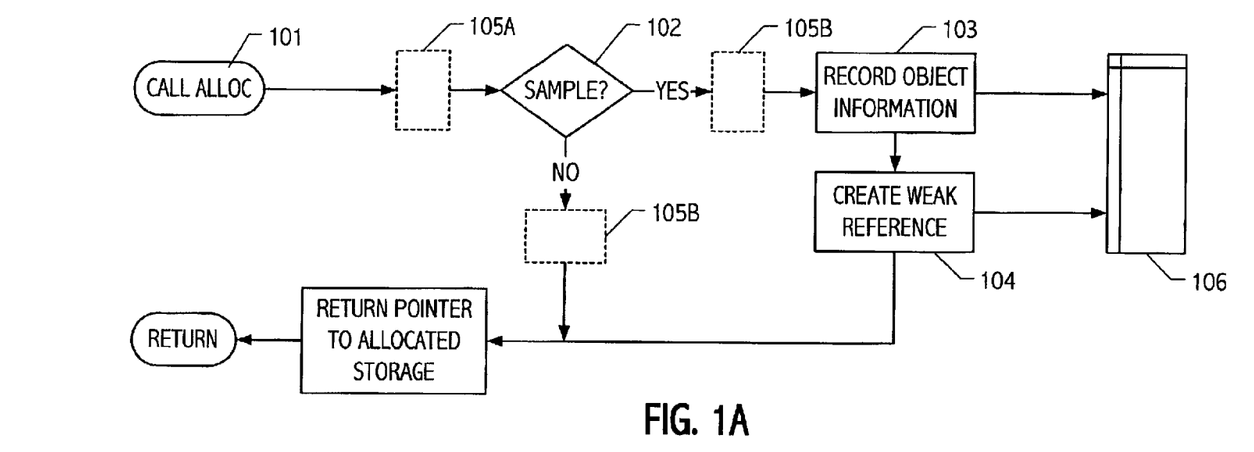
FIG. 1A depicts information and control flows for an object sampling technique in accordance with some embodiments of the present invention.

FIG. 1A illustrates information and control flows for an object sampling technique in accordance with some embodiments of the present invention. In response to allocation requests 101, certain objects are selected (102) for sampling. For those not selected, a pointer to the allocated storage is returned as usual. However, for those selected, certain object information and a weak reference to the allocated object are recorded (103, 104). In general, the order of object information and a weak reference recording is arbitrary, although in some implementations, one order (or the other) may be preferable. While the particular object information recorded may vary from exploitation to exploitation, typically some characterization of allocation time and allocation call site are desirable. Depending on the selection technique employed, selection may be performed before (e.g., 105A), after (e.g., 105B) or as a by-product of allocation. In one particularly low-overhead selection technique described in greater detail below, selection is based on local allocation buffer (LAB) exhaustion and imposes no additional overhead on the allocation of unsampled objects.

The approach combines the use of weak references to track a sample of objects over their lifetimes with the idea of "fingerprinting" such objects, i.e., associating additional information with the objects. The fingerprint summarizes interesting aspects of the state of the system at the point when the object is allocated. In general, a convenient place to store the fingerprint would be in association with the weak reference data structure.

Figure 1B:
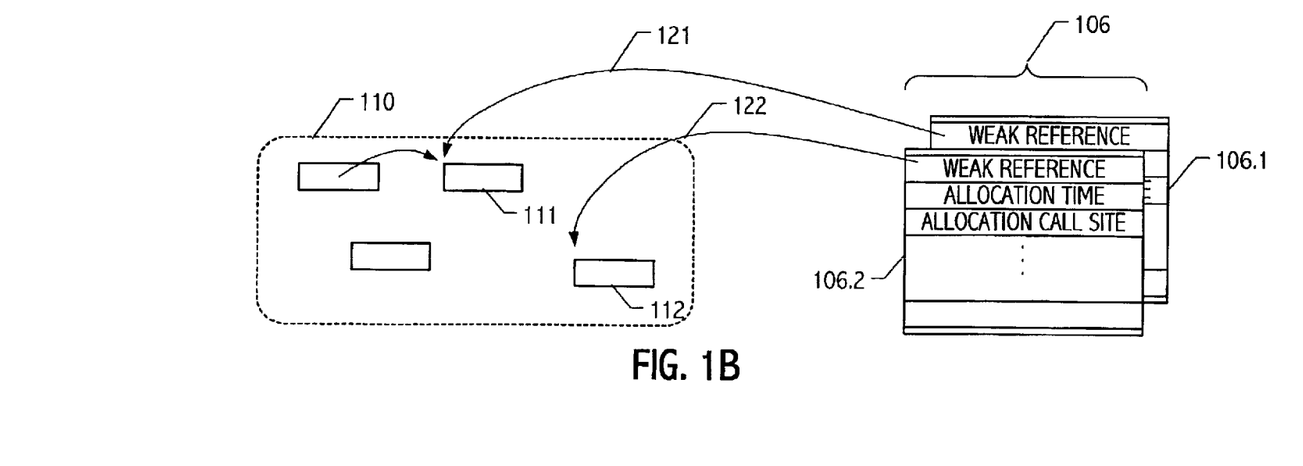
FIG. 1B illustrates hypothetical states of dynamically-allocated storage and of an illustrative object lifetime statistics data structure in accordance with some embodiments of the present invention.

FIG. 1B illustrates a hypothetical state of dynamically-allocated storage 110 and additional object fingerprint information 106 associated with particular object instances using corresponding weak references. In particular, object fingerprint 106.2 includes allocation time and allocation call site information encoded in association with a weak reference (122) that identifies object 112. Object fingerprint 106.1 similarly includes object information encoded in association with a weak reference (121) that identifies object 111. In the illustrated data structure representation, an association between a weak reference identifying a sampled object and corresponding fingerprint information for that object is implicit in the data structure organization. Of course, a wide variety of other data structures and association encodings are suitable and will be appreciated by persons of ordinary skill in the art based on the description herein. Although the structure of encoded information may vary from object-type to object-type, more typically, a uniform object fingerprint encoding is employed.

In general, the particular information included in an object fingerprint is implementation dependent. Examples of the kind of information that one might include in the fingerprint are:

1. The time at which the object is allocated. Allocation time may be measured in many ways: real time, CPU time, number of collections since the start of the application, number of bytes allocated. If we combine information from allocation with information gathered at other points in the program, we can infer reasonable bounds on object lifetimes.
2. The allocation site in the program where the object is created. This may include a summary of information from one or more frames of the calling context for the allocation operation. Many different places in a program may allocate instances of the same class. Sometimes it might be useful to distinguish between these. For example, it may be that String objects allocated at one site (e.g., objects used to encode file names) tend to live much longer than String objects allocated at another site (e.g., those created to print floating point numbers).
3. The type of the object. In most object-oriented languages, this information does not need to be included in the fingerprint since it is stored in the object itself. For other languages where runtime type information is not readily available, it may be approximated by some other metric such as object size.
4. In object-oriented languages, the type of the receiver to which the method performing the allocation is applied.
5. An identifier for the thread performing the allocation. Objects of the same type allocated at the same allocation site by different threads may serve different purposes and, hence, have different lifespans.

Weak references can be implemented relatively efficiently, and by varying the fraction of objects we sample, we can trade efficiency and statistical accuracy against each other. Further, in environments like the Java platform, where support for weak references already exists, we can efficiently gather statistics on sampled objects as they become unreachable without having to explicitly examine the heap for dying objects after each collection.

As can be seen, by including various pieces of information in the fingerprints, and by controlling sampling rates, we can estimate how many objects are allocated of each type (or class), how many objects are allocated at each allocation site and/or how long each category (class, allocation site) of objects tend to live. Furthermore, we can refine the above kind of information either on a per-thread basis or through correlated class information. The uses of such statistical information include optimizations in the memory system as well as offering a source of feedback to the programmer allowing the program to be better optimized or debugged. For instance, in the memory system, it may be desirable to:

1. allocate (or pretenure) certain categories of objects directly into specific generations.
2. promote objects to selected generations.
3. better place and move objects within generations, especially in the context of approaches such as that commonly known as the "train algorithm," proposed by Hudson and Moss. See R. L. Hudson and J. E. B Moss, Incremental Garbage Collection for Mature Objects, in *Proceedings of International Workshop on Memory Management*, volume 637 of Lecture Notes in Computer Science, St. Malo, France, 16–18 Sep. 1992.
4. choose which objects to allocate in thread-local versus global areas of the memory system.

Using the data gathered about reclaimed and still-live objects and their lifespans, we can improve the efficiency of generational collectors through better object placement, reduction in the copying of objects, and reduced collection of individual generations.

Figure 2:
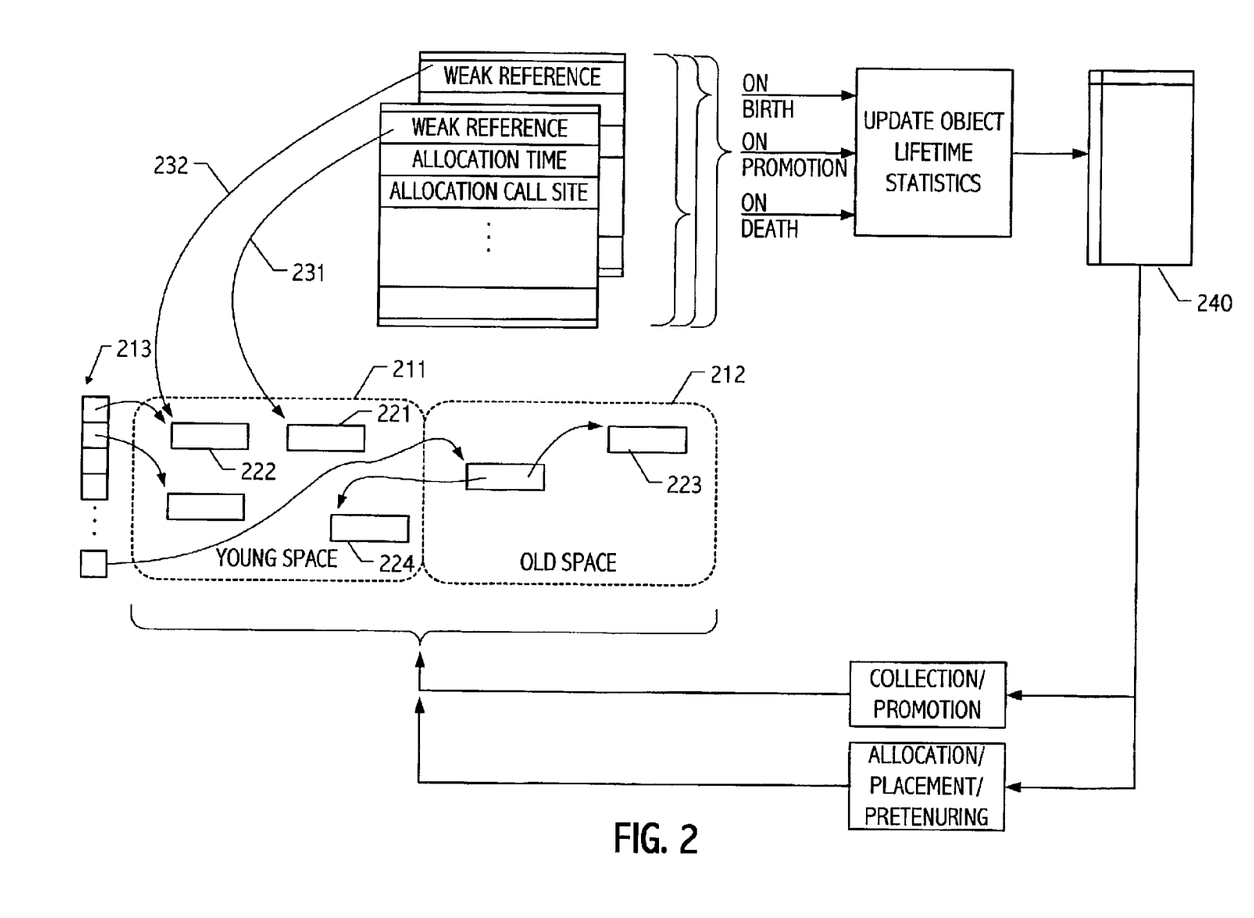
FIG. 2 illustrates use of object lifetime statistics in allocation and/or collection strategies for generationally collected memory in accordance with some embodiments of the present invention.

FIG. 2 illustrates use of object lifetime statistics in allocation and/or collection strategies. In the illustration of FIG. 2, a heap is generationally managed and includes at least two generations, indicated as young space 211 and old space 212, respectively. Objects are represented in each generation and are accessed by a mutator computation (not shown) to perform some useful computation. Active objects are reachable via a root set 213 of pointers of the mutator computation. Some objects, e.g., object 221, are no longer reachable from the root set and are candidates for collection. A subset of the illustrated objects that have been selected for run-time sampling are identified using weak references and have corresponding object fingerprint information recorded that supports computation of object lifetime statistics. For example, objects 221 and 222 are each selected (using any suitable selection technique) for sampling and are each identified by a weak reference (e.g., weak references 231 and 232, respectively) of any suitable form.

In the illustrated realization, birth, death and/or promotion events generate updates to object lifetime statistics 240, which in turn are employed collection, promotion, allocation, placement and/or pretenuring decisions or operations of a garbage collector, allocator or both. In implementations described more completely below, object birth-generated updates are performed coincident with allocation of a sampled object and object promotion and/or death-generated updates are performed coincident with a collection interval in which a sampled object is promoted to an older generation or is determined to be unreachable.

An Illustrative Implementation for Pretenuring

One exploitation of the object sampling techniques described herein is to facilitate pretenuring. In general, pretenuring seeks to automatically place objects (typically coincident with allocation thereof) into an older generation of a generationally maintained heap. One such pretenuring implementation builds on techniques of the present invention to select objects for sampling, to fingerprint sampled objects, to collect lifetime data for sampled objects and to adapt allocation facilities in accordance with the collected data. In the description that follows, we outline an illustrative pretenuring implementation that builds on a platform provided by the Java virtual machine in the Java™ 2 Standard Edition for the Solaris™ Operating Environment (available from Sun Microsystems, Inc. and known as the ResearchVM, previously the ExactVM). This platform provides a useful descriptive context because it is widely available, well documented (see e.g., White and Garthwaite, *The GC Interface in the EVM*, Technical Report SML TR-98-67, 1998, the entirety of which is incorporated herein by reference) and its facilities are generally well-understood by persons of ordinary skill in the art. The ResearchVM includes a configurable garbage collector interface that allows definition of the number, size, and collection policies employed in generations forming a heap. In addition, the ResearchVM supports both application-level and VM-specific classes of weak references and supports method recompilation including a number of optimizations such as the inlining.

Other implementations may be tailored to other execution environments and, based on the description herein, persons of ordinary skill in the art will appreciate suitable adaptations for such environments. Accordingly, reference to facilities of any particular implementation environment and/or use of terminology particular thereto is merely illustrative.

Selection of Objects for Sampling

In general, our approach for sampling of objects imposes very low overhead because it samples only a subset of objects and avoids introduction of overhead on the allocation of non-sampled objects. Memory systems and execution environments such as that provided by some versions of the Java virtual machine often include mechanisms suitable for low-overhead selection of a sampled subset. For example, an execution environment may support one or more of the following mechanisms:

1. Local allocation buffer (LAB) overflow: In some realizations, we select objects for sampling based on LAB refill. For example, an object allocation that exhausts a LAB typically triggers a second level allocator to refill. Accordingly, the triggering object allocation (or some subsequent allocation) can be selected for sampling.
2. Custom-allocator routines: In some realizations, custom-allocator routines can be used to achieve cheap sampling for specific classes.
3. Thread-specific sampling: Allocator routines take a thread identifier as an argument. By comparing this identifier against a global variable or mask, we can provide thread-specific sampling. To cover multiple threads, the global variable is slowly rotated among the threads. Alternatively, we can employ a per thread flag indicating if a thread should be considered for sampling.

Other possible selection mechanisms include:

4. Counter: A counter can be employed as an arbitrary selection mechanism. For example, in one realization, a counter initialized with some positive value is decremented each time an object is allocated. Selection employs a computationally efficient triggering mechanism. For example, if the carry-bit of the decrement is added into the address of the free pointer, then when the counter underflows, the load from the free pointer will be biased causing a misalignment trap. The trap handler can either perform the sampling directly or patch the allocation site to sample the next allocated object. Such an approach imposes some additional computational load (e.g., 4 extra instructions in the fast-path), but avoids skewing.
5. Other overflow: One variation is to build on the basic LAB overflow strategy (described above) but use a smaller limit than actual size of LAB to provide more frequent sampling. The limit can be varied within a range to reduce skew. This variation may be particularly useful in implementations for which the LAB size is large.
6. Sampling functions: Another approach is to use sampling functions such as the pcsample (2) system call provided in the Solaris™ operating system to gather a set of hot program instructions. In general, we can use such functions to identify hot methods or to build hot (possibly interprocedural) paths. By patching or recompiling all allocation sites in those hot areas we can provide selective sampling. The idea is that objects allocated together are likely to have similar lifetimes and should be studied as a group.
7. Combine with static analysis: If we statically determine that a set of allocation-sites allocate objects that are referenced from a sampled allocation-site (e.g., a site selected using one of the selection methods described above), then we can apply a tenuring decision for that sampled site to the referenced set.

Figure 3:
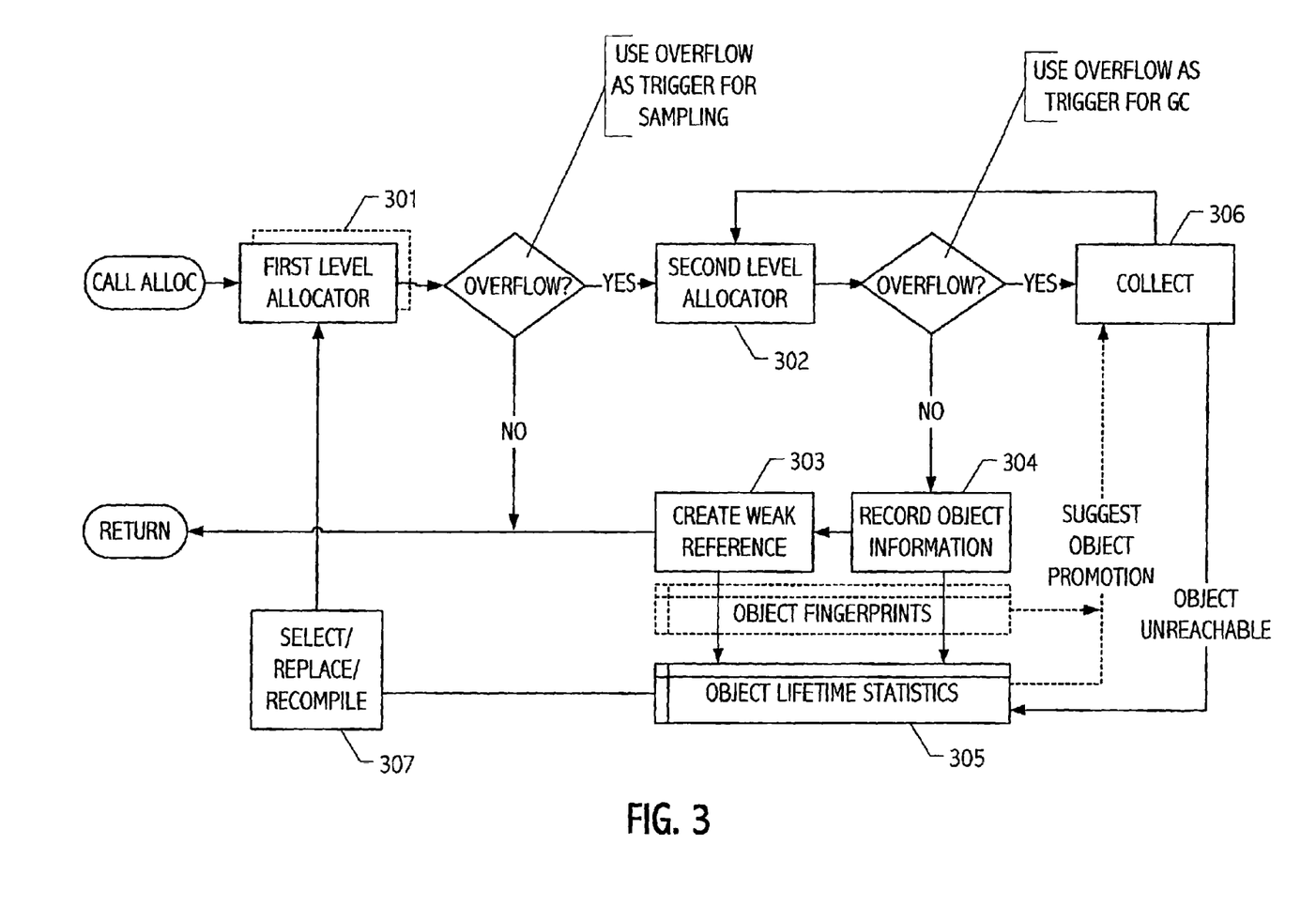
FIG. 3 depicts information and control flows for a dynamic memory management system that employs an object sampling technique in accordance with some embodiments of the present invention in allocation and/or collection strategies.

FIG. 3 illustrates an object sampling implementation that employs overflow of a first-level allocator 301 (e.g., LAB overflow) as a criterion for selection of a sampled subset. If object allocation triggers a first-level allocator 301 overflow, weak reference creation 303 and association (304) of object information can be performed in an overflow handler. Advantageously, objects that are allocated by the first-level allocator 301 without overflow bear negligible overhead, if any, using the illustrated approach. Optionally, overflow of a second level allocator (e.g., second level allocator 302) can be used as a trigger for garbage collection.

The illustrated approach is particularly suitable for implementation using facilities of the ResearchVM in which most allocations are satisfied by sequentially placing objects within LABs. In such implementations, each thread has a separate LAB, so an allocation is implemented largely by incrementing a thread-local pointer. Fast path allocation code, including checks for LAB overflow, includes as few as 9 SPARC assembly language instructions in some implementations. Specialized allocation functions can be used for small object sizes. If an allocation fails because it would cause the current LAB to overflow, then a new LAB is obtained from the second level allocator. The implementation of the second-level allocator is similar, except that LABs are allocated from a shared stretch of memory using an atomic CAS operation. A young generation garbage collection occurs whenever the space used by the second-level allocator is exhausted.

Although the illustrated implementation avoids changes to the allocation fast-path, it is not clear that it necessarily produces a representative selection of objects to sample. This is because, in general, larger objects are more likely to cause a LAB overflow than smaller objects. This skew is apparent on review of benchmark statistics. For example, in benchmarks of a Java language compiler, javac, 26% of all objects allocated are arrays of characters, but they account for 40% of the allocations selected by LAB overflows.

A number of alternative schemes have been considered to reduce this skew. For example, the LAB overflow handler can cause the sampling of the next object to be allocated. Such a scheme can be implemented by leaving the allocation pointer 'broken' so as to cause the LAB overflow handler to be re-entered on the next allocation. However, in the case of javac benchmarks, this modification simply changes the skew rather than avoiding it. For example, arrays of characters are typically allocated while manipulating text and the subsequent allocation is frequently an instance of java.lang.String. More generally, the first-level allocator may select the nth request after the overflow. This qualitatively reduces the skew, but it is less clear whether that the benefit is balanced by the need to make n+1 non-fast-path allocations.

Regardless, after comparing each of these candidate schemes using full-run allocation traces, it appears that the skew introduced is not an important problem. Although it leads to certain kinds of object being sampled more frequently, it does not distort the proportion of tenured objects that occur in each category. Furthermore, it is arguable that a large object skew is desirable (or at least reasonable) because large objects that survive are more expensive to maintain (e.g., in terms of copying and/or scanning overhead) and that accordingly, a greater level of attention is warranted. Accordingly, for applications of the object sampling techniques described herein to pretenuring, the illustrated scheme, sampling each object allocated from the LAB overflow handler, is suitable.

Fingerprinting Using Weak References

We have already discussed the use of weak references as a mechanism for associating information with sampled objects. In general, any form of information may be associated with a sampled object using the techniques described herein. In the context of an exemplary pretenuring system, a desirable set of information typically includes at least some characterization of object creation time, whether encoded as a precise creation or allocation timestamp or as a period or interval corresponding to object creation, and any characterization of type, class, allocation call site or thread, or other circumstances associated with object creation that may be employed to categorize object lifetime statistics and/or make tenuring decisions. As previously described, some of this information may be encoded in a data structure associated with a weak reference.

In general, the preferred weak reference construct is implementation dependent. The ResearchVM (which is used herein as an exemplary implementation environment for purposes of description only) supports the four application-level weak references mandated by the Java Language Specification as well as several kinds of VM-level weak references. Examples of the latter kind include hash tables supporting the interning of strings and the maintenance of loader constraints generated through class loading, resolution, and verification. For our purposes, an appropriate choice of weak reference type is either phantom references or VM-level references since neither allows a dying object to become reachable again when its "imminent death" operations are performed.

Phantom references offer several advantages. First, the PhantomReference class is easily extended to include the data associated with the object. Second, the collector need only queue the phantom references for processing instead of actually processing them during a collection phase. Third, more of the tenuring infrastructure can be expressed in the Java programming language and is, thus, more portable to other Java virtual machine implementations.

A disadvantage is that phantom references occupy space in the heap and may therefore affect the rate at which collections occur. This disadvantage may be reduced in some implementations. For example, if the sampled object and its phantom weak reference object can be allocated in one operation and if the ratio of sampled objects to non-sampled objects is low, then such impact should be minimal.

Advantages of VM-level weak references include a lack of constraints on the format in which the fingerprinting information is represented. For example, in some implementations it may be advantageous to maintain arrays of such references and process these arrays with bulk operations. In addition, VM-level weak references can be allocated outside the heap and accordingly need not affect the rate at which collections occur. The primary disadvantage of VM-level weak references is that a resulting implementation is execution-environment-specific.

Object Lifetime Statistics

Building on the object selection and weak reference facilities described above, object lifetime statistics may be obtained or otherwise derived using information sampled at various stages of the lifecycle of a sampled object. In general, there are several stages at which relevant information may be sampled. First, as described above, certain information characterizing object creation time and categorization is typically, and preferably, sampled at allocation. Second, when (or after) a sampled object becomes unreachable, information characterizing object death can be sampled. As before, time may be treated precisely or as a period or interval corresponding to object death. Typically, there is no need to maintain sampled object information after object death and only a net contribution to an appropriate category of object lifetime statistics need be calculated at death and maintained thereafter. Third, in some implementations, it may be desirable to update object lifetime statistics based on sampling that occurs between birth and death of a sampled object. If a data structure implementation allows a set of sampled objects identified by weak references to be traversed, object statistics may be updated by iterating over the set. For example, some implementations may update calculations of a characteristic tenuring age based on promotion (by a generational collector) of a sampled object to an older generation. Alternatively, manipulation or access to a sampled object may be instrumented during the sampled object's lifetime using the techniques described herein.

Focusing illustratively on an exemplary pretenuring exploitation, the first two sampling techniques, i.e., allocation time sampling and imminent death sampling, may be combined, thereby allowing us to incrementally maintain information about object lifespans without having to traverse potentially extensive data structures. For example, in a simple, two-generation heap, the statistics may take the form of a mean object lifespan and deviation. More generally, though, such object lifetime statistics may take the form of one or more histograms to support tenuring decisions in a multigenerational memory organization. Data characterizing object lifetime may be used to determine when a sufficient number of objects allocated at a given site (or otherwise corresponding to a category) live long enough to justify being placed in a particular generation.

Referring to FIG. 3, contributions to object lifetime statistics 305 are initially made for sampled objects in the context of allocation thereof. Information characterizing object creation time and categorization (e.g., call-site, object type or class, etc.) is sampled and recorded (304) on allocation. A wide variety of data structure representations of such information are suitable. In general, object fingerprints and associated weak references for sampled objects may be encoded separately from a derived representation of object lifetime statistics. Alternatively, a combined encoding may be suitable in some realizations. Whatever the encoding, as sampled objects die, object lifetime statistics can be updated. For example, in the illustrated configuration, once a sampled object is determined to be unreachable (e.g., by collector 306), its contribution to object lifetime statistics (e.g., to mean lifetime or to a population distribution of lifetime) is fixed.

In some realizations, it is desirable to maintain an up-to-date histogram of the birth times and counts of reachable sampled objects and, on death, to remove contributions to an appropriate bucket of the histogram. Using such a histogram together with the current time, we can calculate the distribution of lifespans for a given category of objects (e.g., objects allocated a given site in the program). For sampled objects that become unreachable, we gather their lifespan information in a second histogram directly. Combining these two distributions, we can determine where best to allocate or promote a given object. For example, as long as the mean object lifetime for a particular category of objects exceeds a threshold, we may choose to allocate such objects directly into an older generation of memory. In general, such a choice can be implemented by selecting (307) an appropriate allocator. In some realizations, such a choice may be implemented as an on-the-fly recompilation of a fast path allocator for the corresponding category of object(s). On-the-fly recompilation is employed as a technique for specializing the allocation function at a particular site in a program. However, more generally, any of a variety of on-the-fly code modification techniques may be employed. For example, suitable techniques include patching the site in compiled code to direct calls to an appropriate allocation function, or patching an inline argument (e.g., a constant) that is passed to an allocator to select a desired policy (e.g., placement, pretenuring, etc.). Alternatively or additionally, object lifetime statistics may be employed by a memory management system (e.g., by collector 306) in object promotion decisions.

Representation of Statistics

Figure 4:
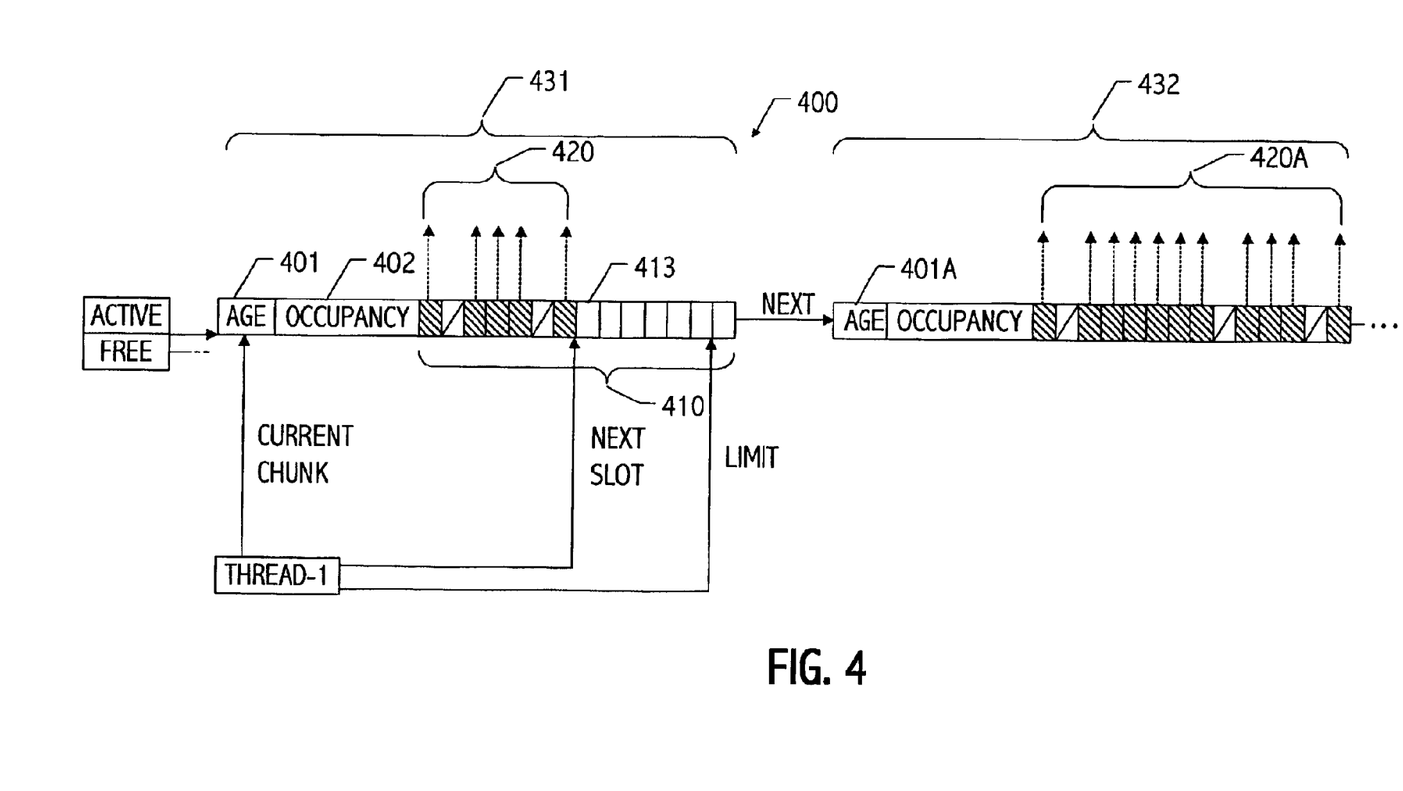
FIG. 4 depicts an illustrative data structure in accordance with some embodiments of the present invention for tracking sampled objects according to age.

While suitable representations for obtaining object lifetime information are, in general, implementation dependent, one representation suitable for a pretenuring exploitation is illustrated in FIG. 4. An auxiliary data structure 400, separate from the main garbage-collected heap, contains per-instance information for each object being sampled. For purposes of illustration, this information includes of two fields—the memory address of the object's allocation site and a weak root that refers to the object. A garbage collector makes a series of callbacks after each collection cycle, at which point, the referents of the weak roots may be examined to determine whether individual sampled objects remain in the young generation, whether they have been tenured or whether they have become unreachable. As previously described, the existence of a weak root referring to a particular object is not considered by the garbage collector when determining the set of objects that are reachable. Weak roots for object sampling are conceptually weaker than any reference that a user may create within their program or that the execution environment employs internally for another purposes.

FIG. 4 illustrates one suitable organization of the data structure. Per-sampled-object information is held in chunks (e.g., chucks 431, 432 . . . ). Each chunk includes an age field 401, an occupancy field 402 and a number of slots 410. Each slot is either empty or contains information about a sampled object. In the illustrated configuration, such information includes the allocation call site and a weak reference to the sampled object (see e.g., weak references 420, 420A). A thread of a sampled computation is associated with a current chunk and, when allocating a sampled object, it records the allocation site and a weak reference to the allocated object in the next slot. In the illustrated data structure, chunks are held in a linked list. The occupancy field encodes a count of the number of non-empty slots. However, to avoid updating the occupancy field whenever a sampled object is allocated, an advantageous encoding records a value that is offset by the number of empty slots beyond the next slot 413. The age field (e.g., 401, 401A) encodes the time at which the chunk became a current chunk.

In some implementations, the data structure is traversed as part of each garbage collection. Each sampled object is examined and if a sampled object has been retained by the copying young generation collector, then the weak root is updated to refer to the new location of the object. If a sampled object has been marked unreachable by the collector, then the weak root is cleared, the occupancy of the chunk is decremented and the count of non-tenured objects for that category is incremented. If a sampled object has been promoted by the young generation collector then the weak root is also cleared, the occupancy of the chunk is decremented and the count of tenured objects for that category is incremented. A chunk can be removed from the list of active chunks when its occupancy falls below a threshold level. Per-category information is held in a hash table indexed by a combination of the object's class and the allocation site program counter.

As described above, one suitable set of data structures for making tenuring decisions in a configurable generational framework includes histograms of object birth time or lifespan distributions. In general, the organization of these histograms should have resolution fine enough to distinguish the ages of objects in the individual generations. Distributions of ages represented by the buckets should, in general, reflect the relative rates and frequencies with which the individual generations are collected. One simple approximation is to scale the per-bucket distributions logarithmically.

Finally, it is desirable in many implementations that employ sampled object lifetime statistics, particularly those in which adaptation to changing program behavior is possible or likely, to provide some level of hysteresis to ensure that decisions, once made, are stable for a while. This goal may be achieved by either periodically purging lifespan data gathered for particular allocation site—for example, when a new tenuring decision is made as to where to place objects allocated at that site—or by "aging" the information in the histogram—for example, with the use of a decay function.

Program Adaptation

There are a number of ways in which dynamically sampled object lifespan information may be used to improve the placement of objects. For example, such information may be employed on allocation of corresponding objects, when promoting an object to an older generation, or when moving an object within a generation. In each case, a decision to place a particular instance of an object may be informed by lifetime information sampled for a corresponding sampled set of objects. For example, sampled object lifetime information may be employed to facilitate pretenuring in automatic dynamic memory management such as described herein or as more completely described in the co-pending U.S. patent application Ser. No. 09/855,453, entitled "Dynamic Adaptive Pretenuring of Objects," naming Agesen, Garthwaite and Harris as inventors and flied May 15, 2001, the entirety of which is hereby incorporated by reference. Similarly, promotion of objects allocated at a given site may be accelerated if sampled object lifetimes suggest that corresponding objects exhibit bimodal behavior—for example, either dying young or living forever. Accordingly, a generational collector exploiting such lifetime information may promote those objects that survive a dynamically-calculated lifetime threshold directly to the oldest generation.

In the case of adaptive allocation decisions such as pretenuring, fast path allocation efficiency may be improved if we are able to recompile the methods for the allocation sites where we wish to set a particular tenuring policy. In some execution environments such adaptation is straightforward. For example, some Java virtual machine implementations provide mechanisms for scheduling a method to be recompiled. When a change in policy is desired, the methods dependent on a given allocation-site are recompiled to implement the new object-placement policy. One advantage of implementations that provide some level of hysteresis in decision making is to reduce potentially excessive recompilation of the same allocation methods.

Other Embodiments

While the invention has been described with reference to various embodiments, it will be understood that these embodiments are illustrative and that the scope of the invention is not limited to them. Many variations, modifications, additions, and improvements are possible. For example, while pretenuring exploitations have been used as a descriptive context, the invention is not limited thereto. Indeed, the described techniques may be employed in any of a number of systems that seek to provide low-overhead sampling of objects during respective lifetimes thereof. Furthermore, while some aspects of the description herein have contrasted dynamic specialization of program behavior based on efficient run-time sampling of objects with mere offline profiling, it will be apparent to persons of ordinary skill in the art that the two techniques need not be distinct, and may, in fact, be combined in some realizations. For example, run-time profiling may serve to tune or adjust program behavior suggested by predictions of offline profiling.

More generally, plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method of generating object lifetime statistics based on run-time observations, the method comprising:
   selecting from amongst object instances of an observed category, a sampled subset of the object instances allocated in one or more execution threads of a computational system;
   coincident with allocation of a sampled instance of an object, establishing a weak reference thereto and associating therewith information indicative of at least allocation time; and
   referencing the sampled instances at run-time via the weak references and updating the object lifetime statistics based on the associated allocation time and then-current state.

2. The method of claim 1,
   wherein the then-current state includes garbage collection state of sampled instances.
3. The method of claim 1,
   wherein the computational system includes a garbage collector; and
   wherein the object lifetime statistics updating is performed in response to a determination by the garbage collector that one or more sampled instances have become unreachable.
4. The method of claim 1,
   wherein the computational system includes a generational garbage collector; and
   wherein the object lifetime statistics updating is performed in response to a determination by the generational garbage collector that one or more sampled instances have become unreachable or have been promoted from a younger generation to an older generation.
5. The method of claim 1,
   wherein the object lifetime statistics updating is performed by periodically accessing the sampled instances.
6. The method of claim 1,
   wherein the object lifetime statistics updating is performed by purging a subset of the object lifetime statistics.
7. The method of claim 1,
   wherein the object lifetime statistics are represented as histogram of lifetimes.
8. The method of claim 1,
   wherein the object lifetime statistics are represented as mean lifetimes.
9. The method of claim 1,
   wherein the object lifetime statistics are calculated using an average birth date.
10. The method of claim 1,
    wherein an observed category corresponds to an object class.
11. The method of claim 1,
    wherein an observed category corresponds to a garbage collection generation.
12. The method of claim 1,
    wherein the associated information indicative of at least allocation time is further indicative of allocation site.
13. The method of claim 1,
    wherein the associated information indicative of at least allocation time is further indicative of an allocating one of the execution threads.
14. The method of claim 1,
    wherein the associated information indicative of allocation time is encoded as one or more of allocation count, system time, CPU time, byte count, and garbage collection count.
15. The method of claim 1,
    wherein the weak reference is of a type not considered in reachability analysis of a garbage collector.
16. The method of claim 1,
    wherein at least some of the sampled subset of the object instances are sampled coincident with death of respective ones of the sampled memory objects.
17. In an automatically reclaimed storage environment, a method of sampling instances of software objects during respective lifetimes thereof, the method comprising:

establishing weak references to respective of the sampled instances, each of the weak references identifying at least one respective sampled instance;

associating allocation-time information with each sampled instance; and accessing the sampled instances via the weak references and performing an action based at least in part on a state of one or more of the sampled instances and respective allocation-time information.

18. The method of claim 17, wherein the weak reference establishing includes storing in a data structure a reference not considered in reachability analysis of the automatically reclaimed storage environment.

19. The method of claim 17, wherein the sampled instances include a representative subset of a category of software objects.

20. The method of claim 19, wherein the category is object class specific.

21. The method of claim 19, wherein the category is call-site specific.

22. The method of claim 19, wherein the category corresponds to an activation record stack profile.

23. The method of claim 19, wherein the category covers an abstract class or interface.

24. The method of claim 19, wherein the category is specific to a particular garbage collection space.

25. The method of claim 17, wherein the allocation-time information includes one or more of:

time of allocation;

allocation site;

allocating thread; and object type.

26. The method of claim 17, further comprising:

selecting at allocation time the sampled instances from amongst all instances of a particular type.

27. The method of claim 26, wherein the selecting is based on allocation buffer overflow.

28. The method of claim 26, wherein the selecting is based on a subset of allocations for each type of sampled software object.

29. The method of claim 28, wherein the subset includes a pseudo random distribution of the allocations.

30. The method of claim 28, wherein the subset includes a deterministic distribution of the allocations.

31. The method of claim 17, wherein at least some of the sampling is performed coincident with death of respective ones of the sampled instances.

32. An object sampling facility for a computational system, the object sampling facility comprising:

a weak reference construct implemented by the computational system; and an object fingerprinter responsive to a storage allocator of the computational system, the object fingerprinter associating (1) allocation-time information and (2) an instance of the weak reference construct with at least a sampled subset of objects allocated by the storage allocator.

33. The object sampling facility of claim 32, further comprising:

an object sampler responsive to garbage collection events in the computational system, the object sampler referencing the sampled subset via the weak reference instances and maintaining object lifetime statistics based on the associated allocation-time information and then-current state of the sampled subset.

34. The object sampling facility of claim 32, further comprising:

an object sampler referencing the sampled subset via the weak reference instances and maintaining object lifetime statistics based on the associated allocation-time information and sampled state of the sampled subset.

35. The object sampling facility of claim 34, wherein the storage allocator is responsive to the object lifetime statistics in its allocation decisions.

36. The object sampling facility of claim 34, wherein a generational garbage collector is responsive to the object lifetime statistics in its promotion decisions.

37. The object sampling facility of claim 30, wherein the allocation-time information is indicative of one or more of:

a time of object allocation;

an allocation site; and an allocating thread.

38. The object sampling facility of claim 32, embodied as a computer program product.

39. The object sampling facility of claim 32, wherein at least some of the sampled subset of objects are sampled coincident with death of respective ones of the sampled objects.

40. A computer program product encoded in at least one computer readable medium, the computer program product comprising:

at least one functional sequence for associating allocation-time information and an instance of a weak reference with at least a sampled subset of objects allocated by a storage allocator; and at least one functional sequence for sampling the sampled subset using the weak reference instances and maintaining object lifetime statistics based on the associated allocation-time information and sampled state of the sampled subset.

41. A computer program product as recited in 40, embodied as a generational garbage collector and further comprising:

at least one functional sequence for tenuring certain object instances in accordance with those of the object lifetime statistics corresponding thereto.

42. A computer program product as recited in 40, embodied as a generational run-time profiler.

43. A computer program product as recited in 40, wherein the at least one computer readable medium is selected from the set of a disk, tape or other magnetic, optical, or electronic storage medium and a network, wireline, wireless or other communications medium.

44. An apparatus comprising:

means for associating allocation-time information with sampled instances of software objects;

means for referencing the sampled instances of software objects, the referencing means operable for both reachable and unreachable ones thereof;

means for updating lifetime predictions for categories of the software objects based on run-time access to states of corresponding ones of the sampled instances and associated allocation-time information therefor.

45. A computer program product as recited in claim 40, wherein at least some of the sampling is performed coincident with death of respective ones of the sampled objects.

46. The apparatus of claim 44, wherein at least some of the sampled instances are sampled coincident with death of respective ones of the sampled instances.

* * * * *

UNITED STATES PATENT AND TRADEMARK OFFICE
CERTIFICATE OF CORRECTION

PATENT NO. : 6,799,191 B2
DATED : September 28, 2004
INVENTOR(S) : Ole Agesen, Alexander T. Garthwaite and Timothy L. Harris It is certified that error appears in the above-identified patent and that said Letters Patent is hereby corrected as shown below:

Column 3,
Line 35, "A subset at these objects" should read -- A subset of these objects --.

Column 6,
Line 37, "p=malloc (size of (SomeStruct)" should read -- p=malloc (sizeof (SomeStruct)) --.

Signed and Sealed this

Nineteenth Day of July, 2005

JON W. DUDAS
*Director of the United States Patent and Trademark Office*